(12) United States Patent
Baker

(10) Patent No.: US 8,006,474 B2
(45) Date of Patent: Aug. 30, 2011

(54) POND CLEANING IMPLEMENT

(75) Inventor: Bruce Baker, Ann Arbor, MI (US)

(73) Assignee: Radius Garden LLC, Ann Arbor, MI (US)

( * ) Notice: Subject to any disclaimer, the term of this patent is extended or adjusted under 35 U.S.C. 154(b) by 0 days.

(21) Appl. No.: 12/426,656

(22) Filed: Apr. 20, 2009

(65) Prior Publication Data

US 2010/0263347 A1    Oct. 21, 2010

(51) Int. Cl.
*A01D 7/00*     (2006.01)
*B01D 35/00*    (2006.01)

(52) U.S. Cl. .................................. 56/400.04; 210/238

(58) Field of Classification Search ............ 15/1.7; 56/400.01–400.21; 210/471, 495, 499, 238; 55/378, 381; 172/371, 373, 378
See application file for complete search history.

(56) References Cited

U.S. PATENT DOCUMENTS

| | | | |
|---|---|---|---|
| 27,213 A | 2/1860 | Force | |
| 354,355 A * | 12/1886 | Seatter | ............ 56/400.06 |
| 1,095,585 A | 5/1914 | Mack | |
| 1,209,060 A | 12/1916 | Snyder | |
| 1,227,478 A | 5/1917 | Meuler | |
| 1,235,371 A | 7/1917 | Paul | |
| 1,782,497 A | 11/1930 | Anderson | |
| 1,866,754 A | 7/1932 | Crane | |
| 2,205,706 A | 6/1940 | Wolff | |
| 2,652,680 A | 9/1953 | Adams | |
| 3,188,668 A | 6/1965 | Buckelew | |
| 3,220,037 A | 11/1965 | Ruhling | |
| 3,310,332 A | 3/1967 | Nelson | |
| 3,608,217 A | 9/1971 | Volsin | |
| 3,688,483 A | 9/1972 | Hamilton | |
| 3,863,237 A | 1/1975 | Doerr | |
| 3,942,832 A | 3/1976 | Haas, Jr. | |
| 3,979,146 A | 9/1976 | Berg | |
| 3,979,890 A | 9/1976 | Schenk | |
| 4,003,100 A | 1/1977 | Whitaker | |
| 4,013,563 A | 3/1977 | Petrik | |
| 4,176,419 A | 12/1979 | MacDonald et al. | |
| 4,190,279 A | 2/1980 | Sguazzin | |
| 4,198,720 A | 4/1980 | Matsumoto et al. | |
| 4,254,981 A * | 3/1981 | Wilson | ............ 294/19.2 |
| 4,481,117 A | 11/1984 | Collins | |
| 4,520,621 A | 6/1985 | Archer | |
| 4,768,331 A | 9/1988 | Jones | |
| 4,799,725 A | 1/1989 | Anderson | |
| 4,828,690 A | 5/1989 | Montez | |
| 4,958,871 A | 9/1990 | Hemans | |
| 4,994,178 A | 2/1991 | Brooks et al. | |
| 5,050,920 A | 9/1991 | Potticary | |
| 5,069,026 A | 12/1991 | Johnson | |
| 5,137,623 A | 8/1992 | Wall et al. | |
| 5,305,585 A | 4/1994 | Cousineau | |

(Continued)

*Primary Examiner* — Robert E Pezzuto
(74) *Attorney, Agent, or Firm* — Gifford, Krass, Sprinkle, Anderson & Citkowski, P.C.

(57) ABSTRACT

An improvement implement for cleaning ponds and the like includes features which facilitate multi-functional applications. The implement includes an open frame having a forward section with opposing side portions, a rearward section, an upper surface, a lower surface, and an inner surface. A plurality of tines extend downwardly from the lower surface of the forward portion of the frame. A net has a bottom defining a length and a periphery. A structure is provided for attaching the periphery of the net to the open frame such that the bottom of the net may be oriented above or below the plane of the frame without interfering with the tines. A handle attached to the rearward section of the flame.

6 Claims, 3 Drawing Sheets

U.S. PATENT DOCUMENTS

| | | |
|---|---|---|
| 5,417,044 A | 5/1995 | Russo |
| 5,450,713 A | 9/1995 | Rohde et al. |
| 5,473,786 A | 12/1995 | Resh |
| 5,482,338 A | 1/1996 | Hall |
| 5,564,267 A | 10/1996 | Bricker et al. |
| 5,858,221 A * | 1/1999 | Conrad ......................... 210/471 |
| 5,868,447 A | 2/1999 | Clark et al. |
| 6,302,277 B1 | 10/2001 | Resh |
| 6,368,502 B1 | 4/2002 | Resh |
| 7,111,741 B2 | 9/2006 | Bramante |

\* cited by examiner

POND CLEANING IMPLEMENT

FIELD OF THE INVENTION

This invention relates generally to pond-cleaning tools and, in particular, to a tool that combines a rake and two-directional mesh collection net.

BACKGROUND OF THE INVENTION

Numerous implements have been devised for gardening, yard work and various pick-up chores. Some tools combine rake-like features with collection bags. For example, U.S. Pat. No. 3,688,483 discloses a multi-purpose household yard and garden tool, the main purpose of which, when fitted with a bag, is for dog refuse collection and disposal. This hand tool has a yoke on one end of the handle with a scraping or hoe blade on one side and rake teeth on the other side in the same plane with the blade. A generally U-shaped spring wire clip fits over the yoke to fasten the opened mouth end of a bag onto the yoke with either the rake teeth forward or the blade forward relative to the open mouth of the bag to enable collecting refuse in the bag. A fresh bag may be applied over the yoke end of the tool when the blade or rake teeth have been soiled during the collection of dog refuse, whereby to seal off the yoke end of the tool when a tie-string or the like is applied around the mouth end of the bag closing it tightly around the handle. Clear plastic bags obtainable on the market designed primarily for food wrapping are ideal for use on this hand tool.

Tools with mesh collection bags have also been designed for water-clearing applications. For example, U.S. Pat. No. 6,368,502 describes a tool for cleaning debris from swimming pools that includes a frame, a net and retaining means for retaining the net on the frame. The preferred retaining means is an elongated strip of resilient, flexible clips having a generally U-shaped cross-section. The preferred frame of the tool is fabricated from metal and includes an elongated, curved frame portion with its ends welded to a tubular attachment member, to permit attachment of the tool to a handle, pole or similar structure.

There have also been invented a wide variety of tools specifically intended for pond cleaning. However, these are designed to solve a specific problem, such a surface skimming, and therefore lack versatility.

SUMMARY OF THE INVENTION

This invention resides in an improvement implement for cleaning ponds and the like including features which facilitate multi-functional applications. The implement includes an open frame having a forward section with opposing side portions, a rearward section, an upper surface, a lower surface, and an inner surface. A plurality of tines extend downwardly from the lower surface of the forward portion of the frame. A net has a bottom defining a length and a periphery. A structure is provided for attaching the periphery of the net to the open frame such that the bottom of the net may be oriented above or below the plane of the frame without interfering with the tines. A handle attached to the rearward section of the frame.

In the preferred embodiment, the forward and rearward sections of the frame each have a radius of curvature, and the radius of curvature of the forward is less than that of the rearward section. The preferred embodiment further includes a raised scraper bar extending upwardly from the upper surface of the forward portion of the frame.

The net has an opening defining a periphery, and the periphery is attached to a ring. The frame preferably includes a plurality of resilient tabs that capture the ring and hold it in position. The tines and/or the scraper bar may have beveled tips or edges. The forward most tines may be longer than at least some of the tines extending downwardly from the side portions of the frame. The handle may be telescoping.

DETAILED DESCRIPTION OF THE INVENTION

Figure 1:
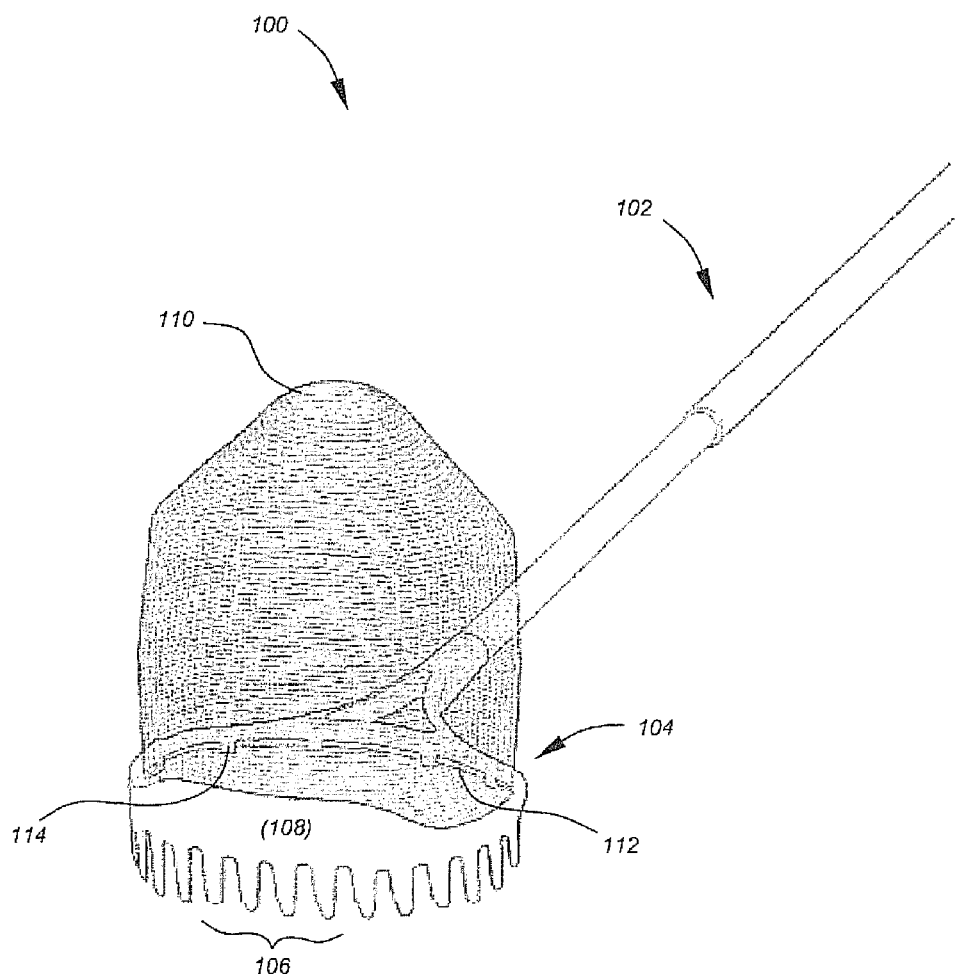
FIG. 1 is a perspective view of the preferred embodiment of the invention.

FIG. 1 is a perspective view of the preferred embodiment of the invention depicted generally at 100. The implement includes a handle 102 which, in the preferred embodiment, is telescoping. The distal end of the handle is connected to an open frame 104 having a lower surface including a plurality of downwardly extending tines 106. The frame 104 includes an upper surface including an optional scraper bar 108.

A mesh net 110 has an opening with a periphery that corresponds to the inner surface of the open frame 104. The periphery of the net 110 is sewn or otherwise attached to a wire frame 112. The open frame 104 includes a plurality of posts 114, each with a resilient tab. The wire frame 112 of the net 110 seats in a channel and is held in position with the tabs.

Figure 2:
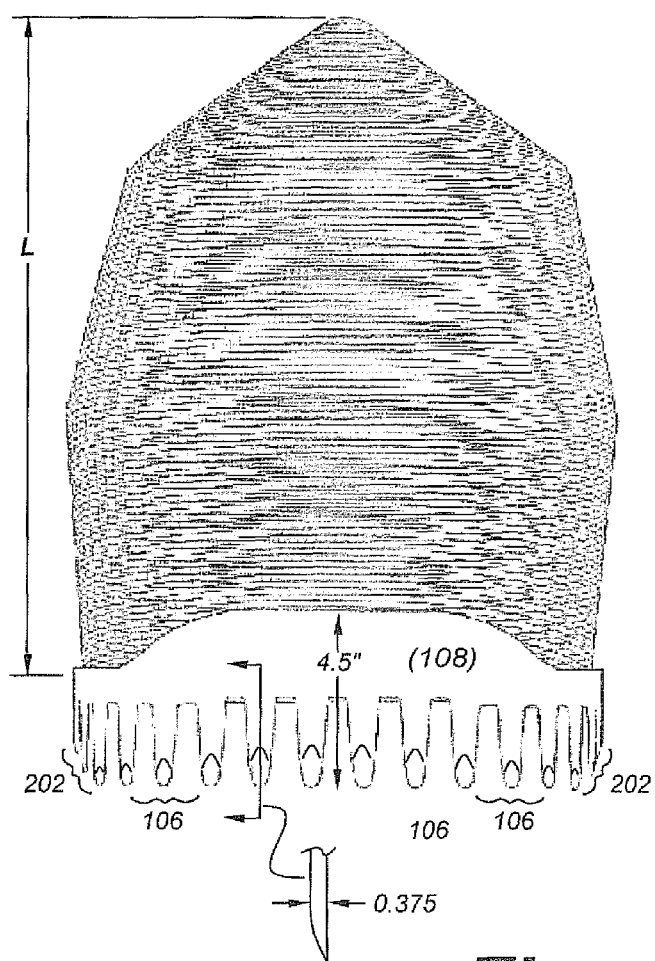
FIG. 2 is front view of the preferred embodiment.

FIG. 2 is front view of the preferred embodiment. The length L of the net is on the order of 12 to 74 inches, preferably 18 inches. The height of the front, from the bottom of the forward tines 106 to the top of the scraper bar is 4.5 inches, more or less. Both the top edge of the scraper bar and the tips of the tines are beveled to increase effectiveness. As can be seen, the tines on the sides of the frame become progressively shorter in the preferred embodiment. Conveniently, the bag can flow in either direction, depending upon when a user is applying the scraper bar or rake.

Figure 3:
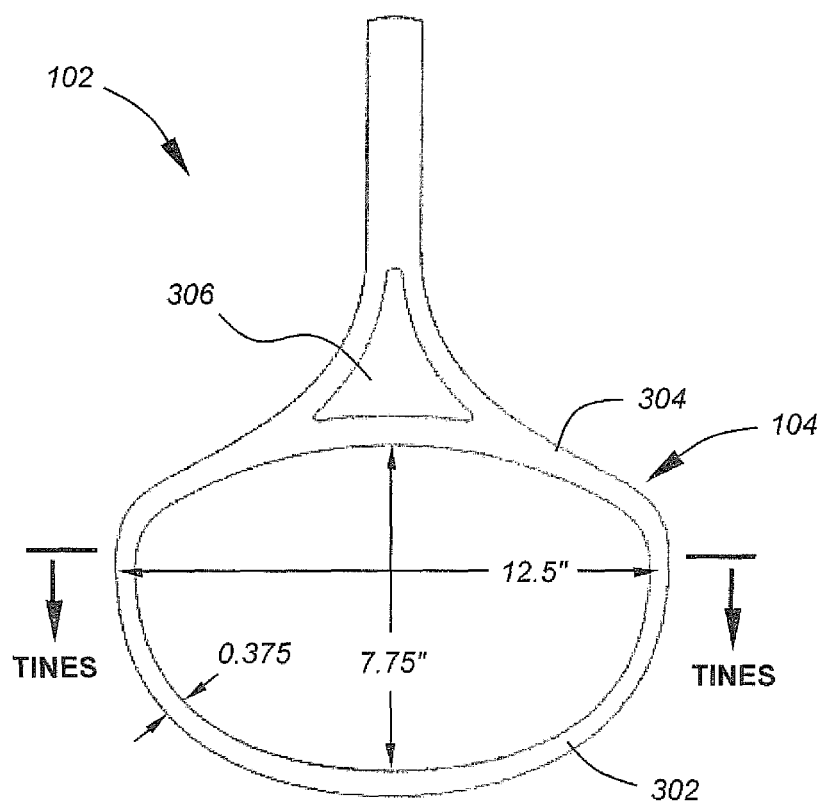
FIG. 3 is a top view with the mesh bag removed.

FIG. 3 is a top view with the net removed. The frame 104 has a forward section 302 with tines, and a rearward section 304 without tines. The radius of curvature of the forward section is preferably smaller than the radius of curvature of the rearward section, creating an opening with compound curves. The width of the frame is in the range of 10 to 16 inches, preferably 12.5 inches, whereas the front-to-back length is in the range of 5 to 12 inches, preferably 7.75 inches. The connection between the handle 102 and frame 104 may include a recessed or cut-out portion 306 to reduce weight.

In terms of materials, the frame is preferably made of a hard resin so it safe to use in natural and artificial water features. The frame may include an inner metal ring for added strength. The handle is made of hard plastic or metal. The mesh net is preferably made from a durable synthetic fiber with openings on the order of 1/16 inch to 3/8 inch.

I claim:

1. An implement for cleaning ponds, comprising:
    an open, hard frame defining a plane, the frame having a forward section with opposing side portions, a rearward section, an upper surface, a lower surface, and an inner surface;
    the frame including an integrally formed rake portion with a plurality of tines extending downwardly from the lower surface of the forward portion of the frame;

the frame further including an integrally formed raised scraper bar extending upwardly from the upper surface of the forward portion of the frame;

a net having a bottom defining a length and an opening defining a periphery;

a structure for attaching the periphery of the net to the frame such that the net can flow in either direction above or below the plane of the frame, depending upon whether a user is applying the scraper bar or the rake;

the structure for attaching the net to the frame including a ring to which the periphery of the net is attached and a plurality of spaced-apart, resilient tabs integrally formed on the frame which capture the ring and hold it in position; and a handle attached to the rearward section of the frame.

2. The implement of claim 1, wherein:
the forward and rearward sections of the frame each have a radius of curvature; and
the radius of curvature of the forward is less than that of the rearward section.

3. The implement of claim 1, wherein the tines have beveled tips.

4. The implement of claim 1, wherein the forward most tines are longer than at least some of the tines extending downwardly from the side portions of the frame.

5. The implement of claim 1, wherein the handle is telescoping.

6. The implement of claim 1, wherein the raised scraper bar terminates in a beveled edge.

* * * * *